United States Patent [19]

Bonis

[11] Patent Number: 4,497,857
[45] Date of Patent: * Feb. 5, 1985

[54] FLEXIBLE HEAT-SEALABLE SHEET AND BAG MADE THEREFROM

[75] Inventor: Laszlo J. Bonis, Swampscott, Mass.

[73] Assignee: Composite Container Corporation, Medford, Mass.

[*] Notice: The portion of the term of this patent subsequent to Jan. 25, 2000 has been disclaimed.

[21] Appl. No.: 547,136

[22] Filed: Oct. 31, 1983

[51] Int. Cl.³ .............................................. B32B 27/00
[52] U.S. Cl. ...................................... 428/35; 428/36; 428/349; 428/516; 156/244.11
[58] Field of Search .................. 428/35, 349, 516, 36, 428/520; 156/244.11

[56] References Cited

U.S. PATENT DOCUMENTS 4,289,830  9/1981  Knot .................................. 428/475.8
4,370,369  1/1983  Bonis .................................... 428/35

Primary Examiner—George F. Lesmes
Assistant Examiner—E. Rollins Buffalow

[57] ABSTRACT

A flexible multilayered heat-sealable sheet comprising a structural layer, a heat-sealing layer on the structural layer and a nonsticky cover layer on the heat-sealing layer and made of material that permits exposure and bonding of the heat-sealing layer when the heat-sealing temperature and pressure are applied.

8 Claims, 3 Drawing Figures

FLEXIBLE HEAT-SEALABLE SHEET AND BAG MADE THEREFROM

FIELD OF THE INVENTION

The invention relates to sheet material useful in making flexible heat-sealable objects such as flexible bags.

BACKGROUND OF THE INVENTION

In making a multilayered heat-sealable object having a heat-sealing layer on a structural layer, one is confronted with the problem that, as the composition of the layer is modified to improve heat-sealing properties, the object may become undesirably sticky at exposed areas that are not heat-sealed. The heat-sealing layer may also have other properties making it undesirable for an exposed layer; e.g., an ethylene-vinyl acetate copolymer layer can generate acetic acid when subjected to sterilizing methods such as radiation and autoclaving, and, if the layer is facing the interior of a bag, the generated acetic acid could contaminate the contents of the bag.

SUMMARY OF THE INVENTION

It has been discovered that by providing a nonsticky cover layer with particular properties on a heat-sealing layer of a sheet, handling is facilitated, good heat-sealing properties are provided, and the fact that the heat-sealing layer is not exposed permits the sheet to be used in applications where the heat-sealing layer might otherwise be objectionable. The nonsticky layer is such that it will permit contact and bonding of the heat-sealing layer with another object (e.g., the heat-sealing layer of another sheet) when the heat-sealing temperature and pressure are applied, but it also remains intact and nonsticky during manufacture and use of the product.

In preferred embodiments, the cover layer is made of material that dissolves into the heat-sealing layer when the heat-sealing temperature and pressure are applied; the cover layer is made of a polyolefin, and the heat-sealing layer is made of ethylene-vinyl acetate copolymer; and the structural layer is a polyolefin with moisture barrier properties (most preferably polyethylene).

The object made from the sheet is preferably a flexible bag of two pieces of the sheet heat-sealed along their edges and having two tubes sealed between the two pieces. The nonsticky cover layer facilitates handling of the sheets during manufacture. Because the heat-sealing temperature and pressure are applied only to the edges at the bond regions, the exposed portions of the cover layers in the centers of the two sheets of the bag remain intact. In use, during disinfection of the bag and liquid in the bag for injection into a patient, the cover layer prevents acetic acid originating in the ethylene-vinyl acetate copolymer layers from getting into the liquid.

DESCRIPTION OF THE PREFERRED EMBODIMENT

The structure, manufacture and use of the preferred embodiment of the invention will now be described after first briefly describing the drawings.

DRAWINGS

STRUCTURE

Figure 1:
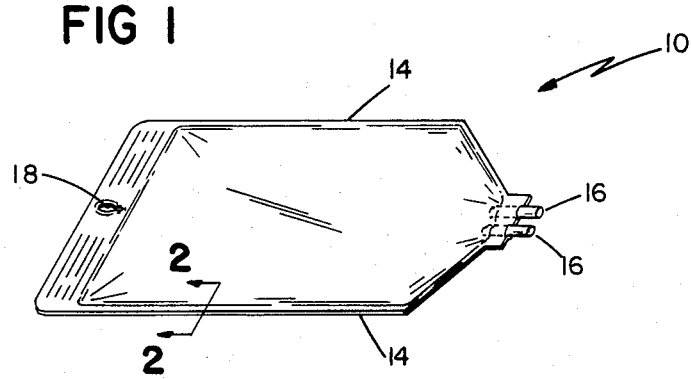
FIG. 1 is a perspective view of a flexible bag made from two pieces of a multilayered sheet according to the invention.
Figure 2:
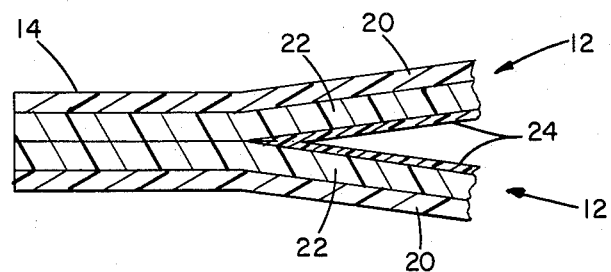
FIG. 2 is a sectional view, taken at 2—2 of FIG. 1, showing the multilayered construction of the layers of the bag at a heat-sealed edge.

Referring to FIGS. 1 and 2, there is shown flexible bag 10 for storing and dispensing parenteral solutions. Bag 10 is made of two coextruded sheets 12 that are heat-sealed at bond regions at their edges 14. Two tubes 16 extend from one end of the bag; at the opposite end is hole 18 for suspending bag 10 from a stand.

Each sheet 12 has 3 mil thick structural layer 20 (high density polyethylene with good clarity and moisture barrier properties), 7 mil thick heat-sealing layer 22 (ethylene-vinyl acetate copolymer having a melt flow index of 2.0 decigrams/min and available under the trade designation ELVAX 3190 from duPont), and 0.2 mil thick nonsticky cover layer 24 made of high flowing polyethylene (having a melt flow index of 9 decigrams/min and available under the trade designation NPE 831 from Northern Petrochemical Corp.).

As is seen in FIG. 2, cover layers 24 do not exist in the heat-sealed bond regions at edges 14; this is because the polyethylene cover layers at these regions have dissolved into the adjacent heat-sealing layers.

MANUFACTURE

Figure 3:
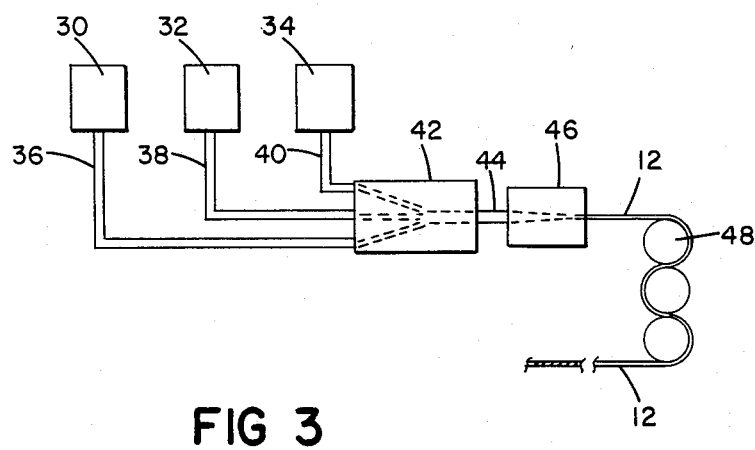
FIG. 3 is a diagrammatic view of the manufacturing process for forming the sheet.

Turning to FIG. 3, the coextrusion process for forming sheets 12 is shown. Three heated containers 30, 32, 34 serve as sources of the cover layer polyethylene, the heat-sealing layer material of ethylene-vinyl acetate copolymer, and high density polyethylene, respectively.

Three conduits 36, 38, 40 supply heated material to coextrusion block 42. There the materials merge together to form under pressure a unitary, three-layer thick stream 44 of generally circular cross-section. Stream 44 passes into extrusion die 46 (e.g., Welex standard 54" flex-lip dye), for extrusion into continuous sheet 12. (The material for cover layer 24 is high flowing relative to the material for heat-sealing layer 22, to permit a consistent coat at the particular dimensions.) Sheet 12 then passes through a series of chilled rolls 48. The sheet is then processed into flexible bags or wound into spools (not shown) for storage.

To make bag 10, two pieces of sheet 12 are cut, tubes 16 are placed in position between the pieces, and edges 14 are heat-sealed to each other using an appropriate sealer. The heat-sealing temperature and pressure cause cover layers 24 to dissolve into layers 22, which bond to each other. Because the heat-sealing temperature and pressure are only applied to the edges, the central portions of cover layers 24 to be exposed to the parenteral liquids remain intact. If the ethylene-vinyl acetate layer were exposed, it would be sticky; thus the nonsticky cover layer facilitates handling during manufacture.

USE

In use bag 10 is filled with parenteral solution, and the solution is sterilized by subjecting the filled bag to radiation and autoclaving. Because the heat-sealing ethylene-vinyl acetate copolymer layers 22 are covered by polyethylene cover layers 24, there is no concern that acetic acid may contaminate the liquid.

OTHER EMBODIMENTS

Other embodiments of the invention are within the scope of the appended claims. For example other materials such as polypropylene could be used in place of the high density polyethylene in structural layer 20. Also the vinyl acetate content in heat-sealing layers 22 can be varied depending on the use, and the material in heat-sealing layer 22 and the material and the thin cover layer 24 could be changed so long as the overall structure is flexible and the cover layer is sufficiently thin and made of material with strength and melt characteristics appropriate to cause exposure and bonding of the heat-sealing layer when heat-sealing temperature and pressure are applied.

What is claimed is:

1. A flexible bag made of two coextruded sheets heat-sealed to each other at bond regions, said heat-sealed sheets each comprising
   an outer structural layer,
   a heat-sealing layer on said structural layer, and
   a nonsticky cover layer on said heat-sealing layer at regions other than said bond regions, said cover layer being sufficiently thin and being made of material with strength and melt characteristics appropriate so that exposure and bonding of said heat-sealing layers to each other occurred at said bond regions when heat-sealing temperature and pressure were applied to said bond regions.

2. The bag of claim 1 wherein said cover layer comprises material that dissolved into the heat-sealing layer when said heat-sealing temperature and pressure were applied.

3. The bag of claim 2 wherein said cover layer comprises polyolefin, and said heat-sealing layer comprises ethylene-vinyl acetate copolymer.

4. The bag of claim 1 wherein said sheets are coextruded, and said cover layer material is high flowing relative to the material of said heat-sealing layer.

5. A method of making a flexible heat-sealable multilayered object comprising coextruding a multilayered sheet comprising
   a structural layer,
   a heat-sealing layer on said structural layer, and
   a nonsticky cover layer on said heat-sealing layer, said cover layer being sufficiently thin and being made of material with strength and melt characteristics appropriate to cause exposure and bonding of said heat-sealing layer when heat-sealing temperature and pressure are applied to a bond region of said sheet, and to cause the sheet to have nonsticky surfaces before heat-sealing and after heat-sealing at regions other than said bond region further comprising heat sealing said sheet to an identical sheet to form a flexible bag.

6. The method of claim 5 wherein said cover layer comprises material that dissolves into said heat-sealing layer when said heat-sealing temperature and pressure are applied.

7. The method of claim 5 wherein said cover layer comprises polyolefin, and said heat-sealing layer comprises ethylene-vinyl acetate copolymer.

8. The method of claim 6 wherein said cover layer material is high flowing relative to the material of said heat-sealing layer.

* * * * *